United States Patent [19]

Nonaka

[11] Patent Number: 5,373,343
[45] Date of Patent: * Dec. 13, 1994

[54] APPARATUS FOR A CAMERA SYSTEM FOR JUDGING DISTANCE BASED ON DISTANCE MEASUREMENTS TAKEN AT CENTRAL AND PERIPHERAL PARTS OF AN IMAGE PLANE

[75] Inventor: Osamu Nonaka, Sagamihara, Japan

[73] Assignee: Olympus Optical Co., Ltd., Tokyo, Japan

[*] Notice: The portion of the term of this patent subsequent to Oct. 19, 2010 has been disclaimed.

[21] Appl. No.: 993,077

[22] Filed: Dec. 18, 1992

Related U.S. Application Data

[63] Continuation of Ser. No. 822,309, Jan. 16, 1992, Pat. No. 5,255,045.

[30] Foreign Application Priority Data

Feb. 25, 1991 [JP] Japan .................... 3-30480

[51] Int. Cl.$^5$ ............................ G03B 13/36
[52] U.S. Cl. ........................................ 354/403
[58] Field of Search .............. 354/403, 402; 356/1, 356/4; 250/201.4

[56] References Cited

U.S. PATENT DOCUMENTS

| | | | |
|---|---|---|---|
| 4,764,786 | 8/1988 | Tamura et al. | 354/403 |
| 4,831,403 | 5/1989 | Ishida et al. | 354/402 |
| 4,959,678 | 9/1990 | Nakagawa | 354/403 |
| 4,988,856 | 1/1991 | Hamada et al. | 354/402 X |
| 5,097,282 | 3/1992 | Itoh et al. | 354/402 |
| 5,136,148 | 8/1992 | Nonaka | 354/403 |
| 5,204,714 | 4/1993 | Nonaka et al. | 354/403 |
| 5,255,045 | 10/1993 | Nonaka | 354/403 |

Primary Examiner—William B. Perkey
Attorney, Agent, or Firm—Louis Weinstein

[57] ABSTRACT

In a camera distance measuring apparatus a light projector projects light along a plurality of axes, a first distance detector receiving light of one axis reflected from an object detecting the distance of an object in the center of the picture, a second distance detector receiving light of another axis reflected from the object and detecting the distance to the object on the periphery of the picture, a moving speed detector receiving light of one axis reflected from the object and detecting the speed of the object in the optical axial direction, a judging device judging whether object distance in the central part of the picture is farther than a predetermined value, an object distance detector operating the second distance detector when the distance to the object in the picture central part is greater than the predetermined value and determining the distance to the object based on the measurements of the first and second distance detectors, an object distance presuming control operating the moving speed detector when the distance to the object in the picture central part is less than the predetermined value and presuming the object distance after a predetermined time based on the detected speed, the measured distance and a predetermined time interval and a focusing control adjusting the photographing lens according to object distance determined on the basis of the judged result of the judging device or the distance to the object presumed by the object distance presuming control.

27 Claims, 8 Drawing Sheets

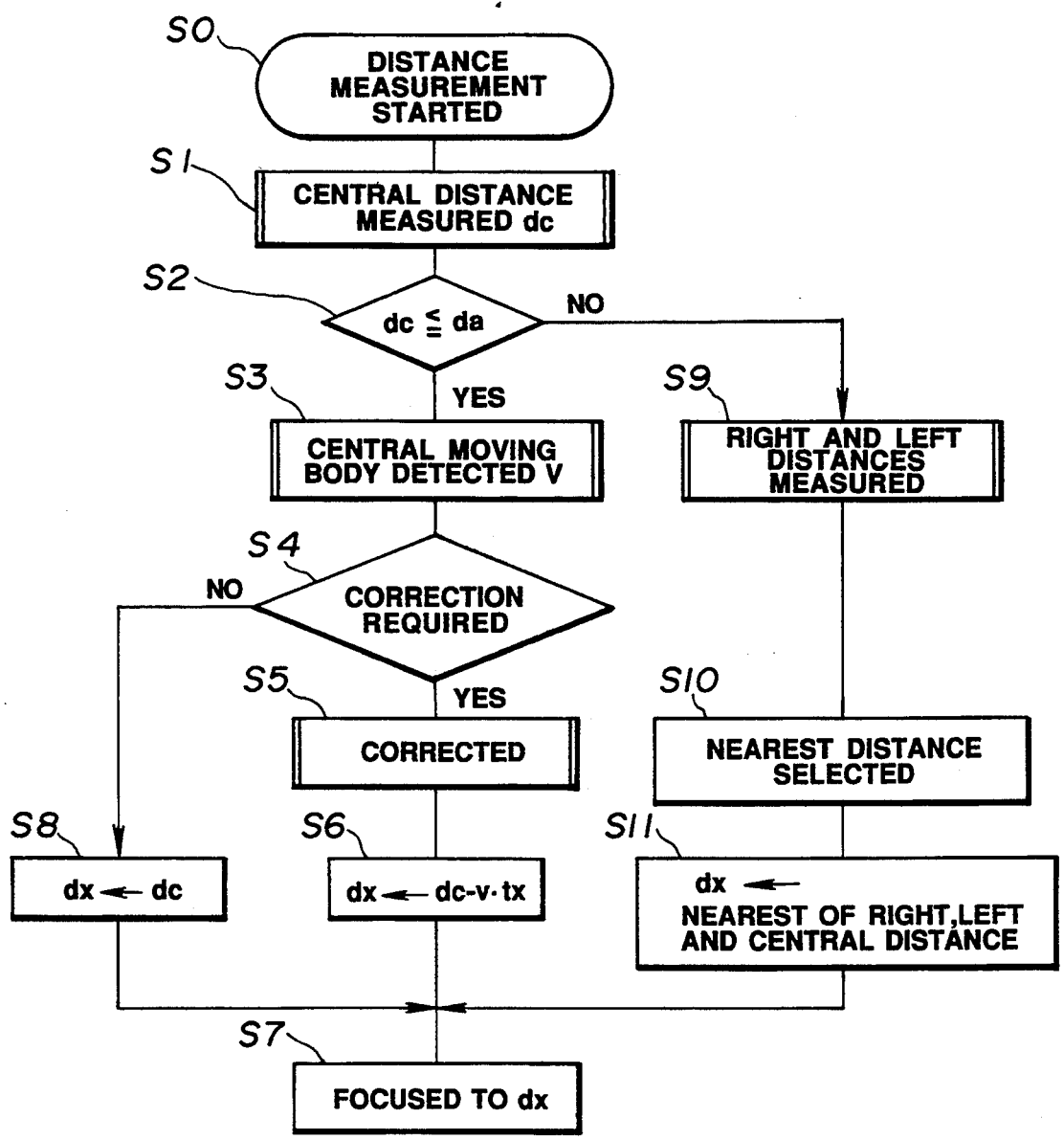

APPARATUS FOR A CAMERA SYSTEM FOR JUDGING DISTANCE BASED ON DISTANCE MEASUREMENTS TAKEN AT CENTRAL AND PERIPHERAL PARTS OF AN IMAGE PLANE

This is a continuation of application Ser. No. 07/822,309, filed Jan. 16, 1992, now U.S. Pat. No. 5,255,045.

BACKGROUND OF THE INVENTION

1. Field of the Invention

This invention relates to camera systems having distance measuring apparatus and more particularly to a camera system having a distance measuring apparatus for automatically focusing.

2. Related Art Statement

Recently, most of the operations in a camera which have been conventionally operated by hand are being automated and accordingly the focusing technique of the camera, that is, the technique of automatically focusing an object hard to focus has been improved. However, the technique of automatically focusing the below described objects, that is, (1) an object present outside the center of a photographed picture and (2) a moving object is particularly difficult and has been desired to be improved.

As conventional technical means for automatically focusing these objects and preventing defocusing, corresponding to the above mentioned respective items (1) and (2), there have been two techniques including:

[1] a multi-point distance measuring technique of measuring distances to objects present at a plurality of points within a photographed picture and

[2] a moving object distance measuring technique wherein a distance to an object present at a point within a photographed picture is measured, then the distance to the object present at this point is measured by delaying the time, these measurements are made a plurality of times, on the basis of the results of these distance measurements, the moving speed of the object is detected and thereby the focus lag with the movement of the object as produced during the release time lag is prevented. Regarding the latter moving object distance measuring technique, for example, a detecting apparatus for detecting the speed of a moving object on a belt conveyer is disclosed in the publication of Japanese patent application laid open No. 23257/1987 and an automatic focus adjusting apparatus whereby an automatically focused state can be maintained irrespective of the motion of the object is disclosed in the publication of Japanese patent application laid open No. 159817/1988.

However, in the above mentioned two techniques, that is, the multi-point distance measuring technique and moving object distance measuring technique, there is a problem that time is taken to measure the distance to the object. That is to say, on the above mentioned paragraph [1], the more the number of points for measuring the distances to the objects, the longer the time required to measure the distances. On the above mentioned paragraph [2], the distance measurement while delaying the time is required a plurality of times and the time required to measure the distance will be long. Therefore, in both of the distance measuring techniques in the above mentioned paragraphs [1] and [2], the release time lag has been likely to be produced.

That is to say, in the camera having the multi-point distance measuring function and moving object distance measuring function, with merely combining these techniques, the release time lag will become long and the precious shutter chance is likely to be missed.

OBJECTS AND SUMMARY OF THE INVENTION

A first object of this invention is to provide a camera system of a camera having both a multi-point distance measuring apparatus function and moving object distance measuring apparatus function and having a distance measuring apparatus which can shorten the release time lag and therefore will not miss a precious shutter chance.

A second object of this invention is to provide a camera system having a distance measuring apparatus which can precisely correspond to a moving object without increasing such part as a condenser, that is, in an advantageous form in respect of the cost and space.

Briefly this invention comprises a light projecting means projecting light beams along a plurality of distance measuring axes, a first distance measuring means receiving the reflected light from the object of the light beams projected toward the optical axial direction of the photographing lens by the above mentioned light projecting means and detecting the distance to the object in the center of the photographed picture on the basis of the signal responding to the reflected light receiving position, a second distance measuring means receiving the reflected light from the object of the light beams projected toward a direction different from the optical axial direction of the photographing lens by the above mentioned light projecting means and detecting the distance to the object on the periphery of the photographed picture on the basis of the signal responding to the reflected light receiving position, a moving speed detecting means receiving the reflected light from the object of the light beams projected toward the optical axial direction of the photographing lens by the above mentioned light projecting means and detecting the value responding to the moving speed of the object present in the above mentioned optical axial direction, a judging means judging whether the distance to the object in the central part of the photographed picture is farther than a predetermined value or not as a result of the distance measurement by the above mentioned first distance measuring means, an object distance determining means operating the above mentioned second distance measuring means case the distance to the object in the central part of the photographed picture is farther than the predetermined value as a result of the judgment of this judging means and determining the distance to the object on the basis of the measured results of the above mentioned first and second distance measuring means, an object distance presuming means operating the above mentioned moving speed detecting means in case the distance to the object in the central part of the photographed picture is nearer than the predetermined value as a result of the judgment of the above mentioned judging means and presuming the distance to the object after a predetermined time on the basis of the speed detected by this moving speed detecting means and the distance measured result of the above mentioned first distance measuring means and a focusing means controlling the photographing lens on the basis of the distance to the object determined by the above mentioned object distance determining means on the basis of the judged result of the above mentioned judging means or the distance to the object presumed by the above mentioned object distance presuming means.

Here, the fundamental conception of the present invention shall be explained.

The present invention is to effectively utilize the two techniques of the above mentioned multi-point distance measuring technique and moving object distance measuring technique while suppressing the release time lag to be minimum from the fact that the above mentioned moving object distance measuring technique is not so effective to a far distance object.

Generally, more than 80% of photographed pictures can be photographed to be desired photographs by measuring the distance in the central part of the photographed picture and focusing with only the result. Most of the cases of out focus of the remaining 20% are generated in the state that there is no desired object in the central part of the photographed picture, for example, that two figures are standing as arranged. This is a so-called "intermediate through phenomenon" in which the measuring light passes intermediately through between the two figures.

At the time of this "intermediate through phenomenon", the result of measuring the distance in the center of the photographed picture should show an infinity ∞ or a considerably far distance. Therefore, except for the case that the result of measuring the distance in the center of the picture shows a considerably far distance, the multi-point distance measurement need not be made.

Unless an object of such high speed is to be photographed, the moving object distance measurement will be able to be expected to have a remarkable effect only in a near distance.

Generally, the focus position of the photographing lens is proportional to the reciprocal of the distance d (referred to as an object distance hereinafter) to the object but in the case of photographing an object moving at a speed, for example, of 2 m per second for the sake of simplification, if the time lag is 0.5 second, the correction of the focus position proportional to $$\frac{1}{d} - \frac{1}{d-1} = \frac{d-1-d}{d(d-1)} \qquad (1)$$
$$= \frac{1}{d(d-1)}$$

will be necessary but the smaller the object distance d, the larger the corrected amount.

Reversely speaking, when the object distance d is large, even if the focus position for the object is not corrected, the object will normally enter the photographed field depth of the lens and will not be out of focus and the moving object distance need not be particularly measured.

In the case of photographing a moving object, the moving object will be followed, naturally the human eye will gaze at the center within the picture and therefore, with a considerable probability, the main object will be considered to be present in the center of the picture.

Summarizing the above:
(a) As the multi-point distance measurement is to prevent the intermediate through phenomenon, except in the case that the object in the central part of the photographed picture is at a far distance, the distance measurement on the peripheral part of the photographed picture can be omitted.

(b) In case the object is at a far distance, the object will be able to be covered with the photographed field depth and therefore, even if the object is a moving object, the moving object distance measurement will be able to be omitted.

(c) In the case of following a moving object, the probability of positioning the object in the center of the photographed picture will be so high that, in the moving object distance measurement, the distance measurement in the peripheral part of the photographed picture will be able to be omitted.

Therefore, in the camera system having a distance measuring apparatus of the present invention:
(1) The distance of the object substantially in the central part of the photographed picture is measured by the first distance measuring means.
(2) if the result of measuring this distance is a far distance exceeding a predetermined value, the intermediate through phenomenon will be judged to be likely and the distance of the peripheral part will be measured by the second distance measuring means, that is, the multi-point distance will be measured.
(3) On the other hand, if the above mentioned distance measured result does not exceed a predetermined value, that is, is not a far distance, now the moving object distance will be measured.

The above is the fundamental conception of the present invention.

These objects and advantages of the present invention will become further apparent from the following detailed explanation.

BRIEF DESCRIPTION OF THE DRAWINGS

FIG. 4 is a flow chart showing the operation of the distance measuring apparatus showing the first embodiment of the present invention.

DETAILED DESCRIPTION OF THE PREFERRED EMBODIMENTS

Prior to explaining the details of the embodiments of the present invention, the distance measuring principle of the active type triangular distance measuring system and the detecting principle of the moving object speed detecting system used in the embodiments shall be explained.

First of all, the distance measuring principle of a known active type triangular distance measuring system shall be explained with reference to FIG. 1.

Figure 1:
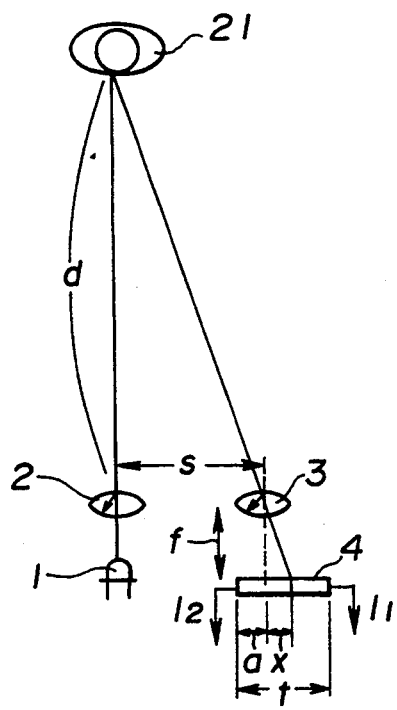
FIG. 1 is a diagram for explaining the distance measuring principle of an active type triangular distance measurement.

In FIG. 1, an infrared ray emitting diode (abbreviated as IRED hereinafter) 1 projects infrared rays toward an object 21 through a light projecting lens 2. The reflected light from the object 21 enters a position sensitive device (abbreviated as PSD hereinafter) 4 through a light receiving lens 3. The entering position x depends on the object distance d and is given as in the following formula:

$$x = s \cdot f / d \quad (2)$$

wherein f represents a focal length of the light receiving lens 3 and s represents a distance (base line length) between the optical axes of the light projecting and receiving lenses 2 and 3.

Now, when the distance from one end of the PSD 4 to the point at which the optical axis of the light receiving lens 3 crosses the PSD 4 is represented by a and the total length of the PSD 4 is represented by t, if the total sum of the light currents generated by the incident signal light is represented by $i_{po}$, $$I1 = \frac{a+x}{t} i_{po} \quad (3)$$

$$\therefore I1 = \left(\frac{a}{t} + \frac{s \cdot f}{t} \cdot \frac{1}{d}\right) i_{po} \quad (4)$$

$$i_{po} = I1 + I2, \quad (5)$$

from the above, $$\frac{I1}{I1 + I2} = \left(\frac{a}{t} + \frac{s \cdot f}{t} \cdot \frac{1}{d}\right) \quad (6)$$

That is to say, if the ratio $\{I1/(I1+I2)\}$ of the two signal light currents of the PSD is taken, the object distance d will be able to be operated on the basis of the above mentioned formula (6) from the constants a, t, s and f.

Also, the total sum $i_{po}$ of the light currents generated by the reflected signal lights from the object positioned at the object distance d is inversely proportional to the square of the object distance d and therefore will be given by the below mentioned formula (7) if the total signal light current from the chart of the standard reflection factors positioned at an object distance of 1 m is represented by $I_{po}$:

$$i_{po} = (1/d)^2 \cdot I_{po}. \quad (7)$$

Thus, if $I_{po}$ is constant, the object distance d will be able to be determined also from the total sum $i_{po}$ of the signal light currents.

Therefore, in this specification, the distance measuring system in the form of the above mentioned formula (6) whereby the distance can be measured without depending on the reflection factor of the object shall be mentioned as a ratio operating system and the distance measuring system by the above mentioned formula (7) shall be mentioned as a light amount detecting system.

Now, the ratio operating system is not influenced by the reflection factor of the object as described above but is accompanied with the operation of the ratio and therefore, as evident from the fact that, for example, in case the denominator becomes 0 under the influence of a noise, the distance measuring output will become infinity $\infty$, when the S/N reduces, the precision will become very low.

On the other hand, the light amount detecting system is only to detect the sum of the signal light currents I1 and I2 and is therefore a system more advantageous to the S/N than the ratio operating system. Further, in this system, when the IRED is made to emit light several times and the output is integrated, the effect of improving the distance measuring precision will be remarkably shown. The above is the distance measuring principle of the active system triangular distance measurement.

The detecting principle of the moving object speed detecting system to which the distance measuring principle by the above mentioned ratio operating system is applied shall be explained in the following with reference to FIGS. 2A and 2B.

Figure 2A:
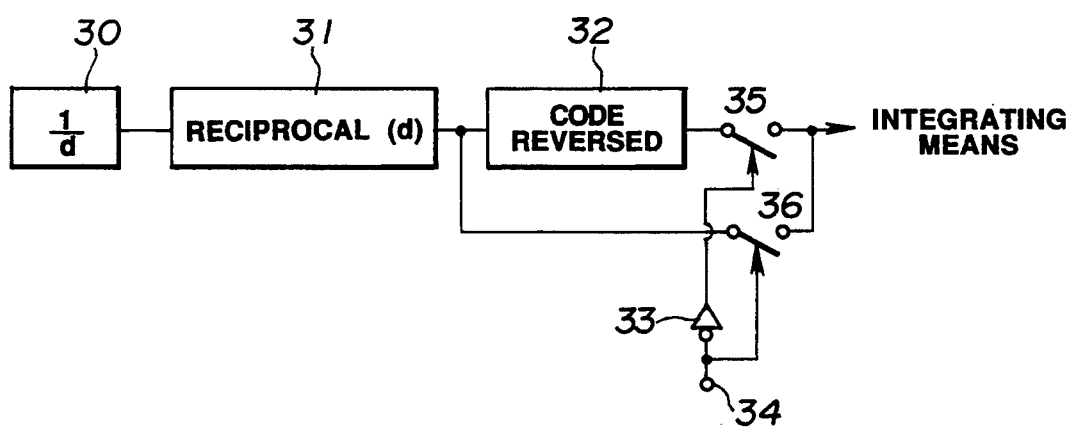
FIGS. 2A and 2B respectively show a block diagram of the formation of a moving object speed detecting system and a timing chart for explaining its operation.

FIG. 2A is a block diagram showing the formation of this technical means. A 1/d circuit 30 is to determine a reciprocal 1/d of an object distance by the principle of the above mentioned formula (6). The reference numeral 31 represents a reciprocal converting circuit for converting the reciprocal to determine the object distance d. 35 and 36 represent such switches as, for example, analogue switches whereby the output to be fed to an integrating means is switched together with a code reversing circuit 32 and inverter 33 according to the logical level of a signal applied to a terminal 34.

By the way, the above mentioned technical means is the same as the technical means disclosed in FIG. 15 in U.S. patent application Ser. No. 720,738 assigned to the present assignee. The above mentioned 1/d circuit 30, reciprocal converting circuit 31 and code reversing circuit 32 correspond respectively to the circuits represented by the reference numerals 330, 337 and 350 in the circuit in the above mentioned FIG. 15. The above mentioned switches 35 and 36 correspond respectively to the SW5 and SW6 in the circuit in the above mentioned FIG. 15.

Figure 2B:
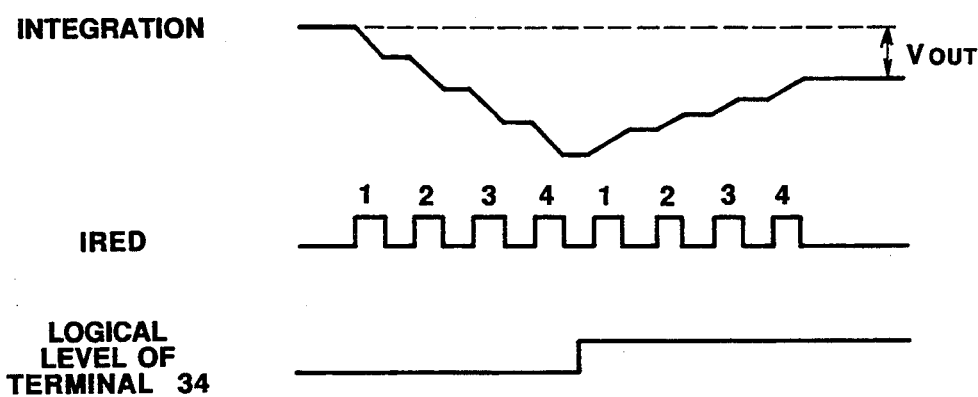

FIG. 2B is a timing chart for explaining the operation wherein, in case the IRED emits light, for example, eight times, the logical level of the terminal 34 will be switched in the front half and rear half so that the front half will be integrated in the negative direction by switching the switch 35 on and the rear half will be integrated in the positive direction by switching the switch 36 on.

That is to say, as the output of the integrating means for one time light emission of the IRED depends on the object distance d, when the integrating direction is thus switched intermediately between IRED light emissions, after the IRED light emission ends, the output depending on the moving speed v of the object will be output as Vout from the integrating means. The above is a description of the detecting principle of the moving object speed detecting system to which the distance measuring circuit by the ratio operating system is applied.

Figure 3:
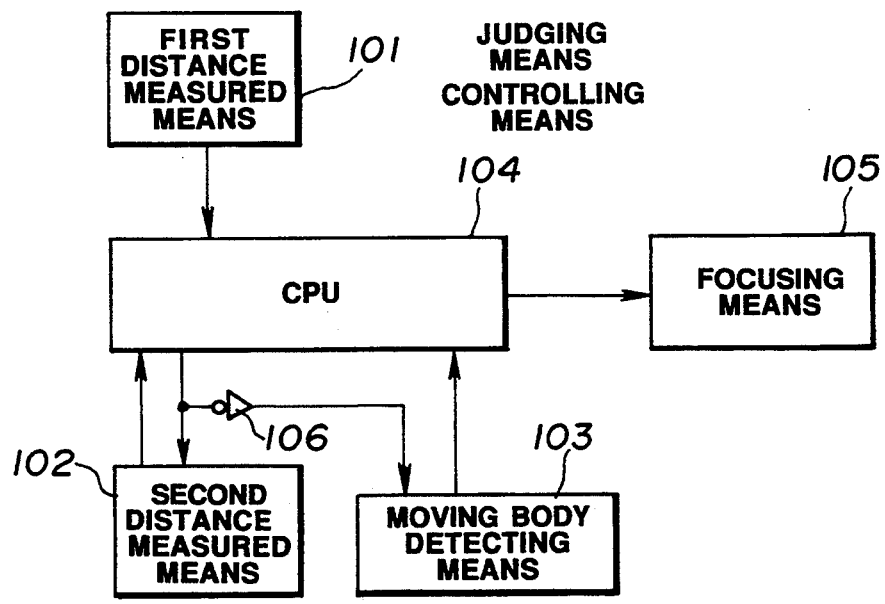
FIG. 3 is a block formation diagram of a distance measuring apparatus showing a first embodiment of the present invention.

FIG. 3 is a block formation diagram of a distance measuring apparatus showing the first embodiment of the present invention. The reference numeral 101 represents a first distance measuring means for measuring the distance to an object present in the central part within a photographed picture. Its output result is judged by a CPU 104 which is also a judging means and controlling means. The next operation order is fed to a second distance measuring means 102 for measuring the distance to an object present on the peripheral part of a photographed picture or to a moving object detecting means 103 outputting a signal depending on the speed of the object through a gate 106.

Then, the CPU controls a focusing means 105 comprising a focusing lens, actuator and position detecting encoder on the basis of the output result of the above mentioned second distance measuring means 102, moving object detecting means 103 or first distance measuring means 101. By the way, the reason why the multipoint distance measurement or moving object distance measurement is switched in response to the output of the first distance measuring means 101 is as explained in the above mentioned fundamental conception.

FIG. 4 is a flow chart of the distance measuring sequence in the above mentioned FIG. 3. When, in step S0, for example, by the operation of a release switch not illustrated, a distance measurement starting signal is input into the CPU 104, as shown in step S1, the distance of the center of the picture from the apparatus of FIG. 3 will be measured. In step S2, this distance measured result dc is compared with a predetermined object image da and, if $$dc \leqq da$$

is satisfied, the correction when the object is a moving object will be necessary. Therefore, in step S3, the moving object is detected and the object speed v is determined.

If this speed v is small and the object is, for example, a still object, it will not be required to be corrected. Therefore, in step S4, this is judged. The process proceeds to step S8 in which the distance measured result dc is stored in the memory region dx of the CPU 104 and the photographing lens is driven to focus this dx point.

Returning to the above mentioned step S4, if the object speed v is so large as to require to be corrected, as shown in steps S5 and S6, the distance of $$dc - v \cdot tx$$

wherein tx represents a time lag after the dc distance is measured until the exposure is started will be focused.

Returning to the above mentioned step S2, if the distance measured value dc is farther than a predetermined distance da, as described above, the intermediate through passage will be likely. Therefore, the distance to the object on the peripheral part of the picture is measured by the second distance measuring means. Here, in step S9, the distances of two right and left points are measured. In step S10, the measured data of the nearest point of the three points including the central point are selected. Through the step S11, the lens is moved to focus the position shown by the nearest distance measured data.

The above is the explanation of the first embodiment of the present invention,

The second embodiment of the present invention shall be explained in the following.

Figure 5:
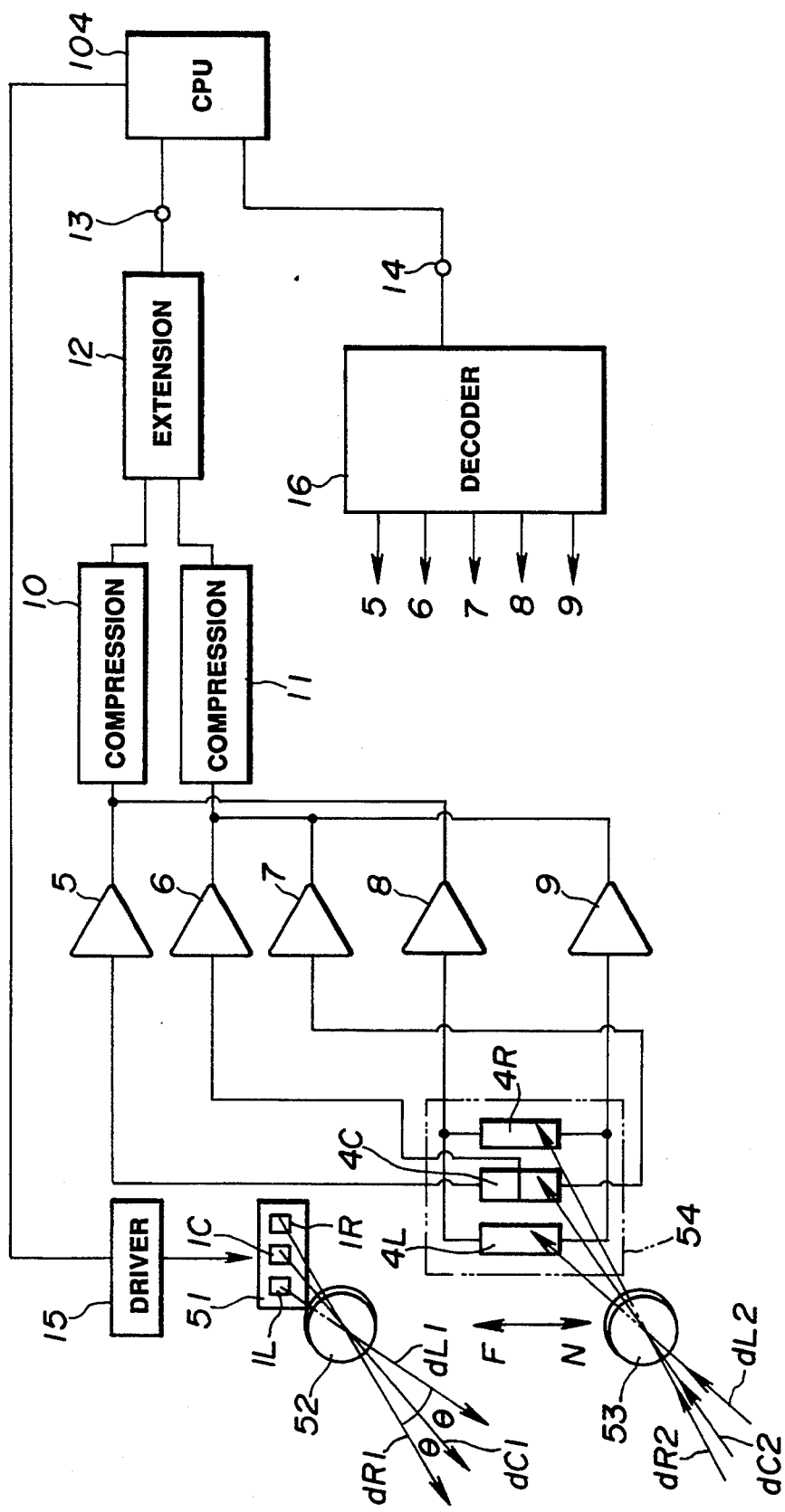
FIG. 5 is a block formation diagram of a distance measuring apparatus showing a second embodiment of the present invention.
Figure 6:
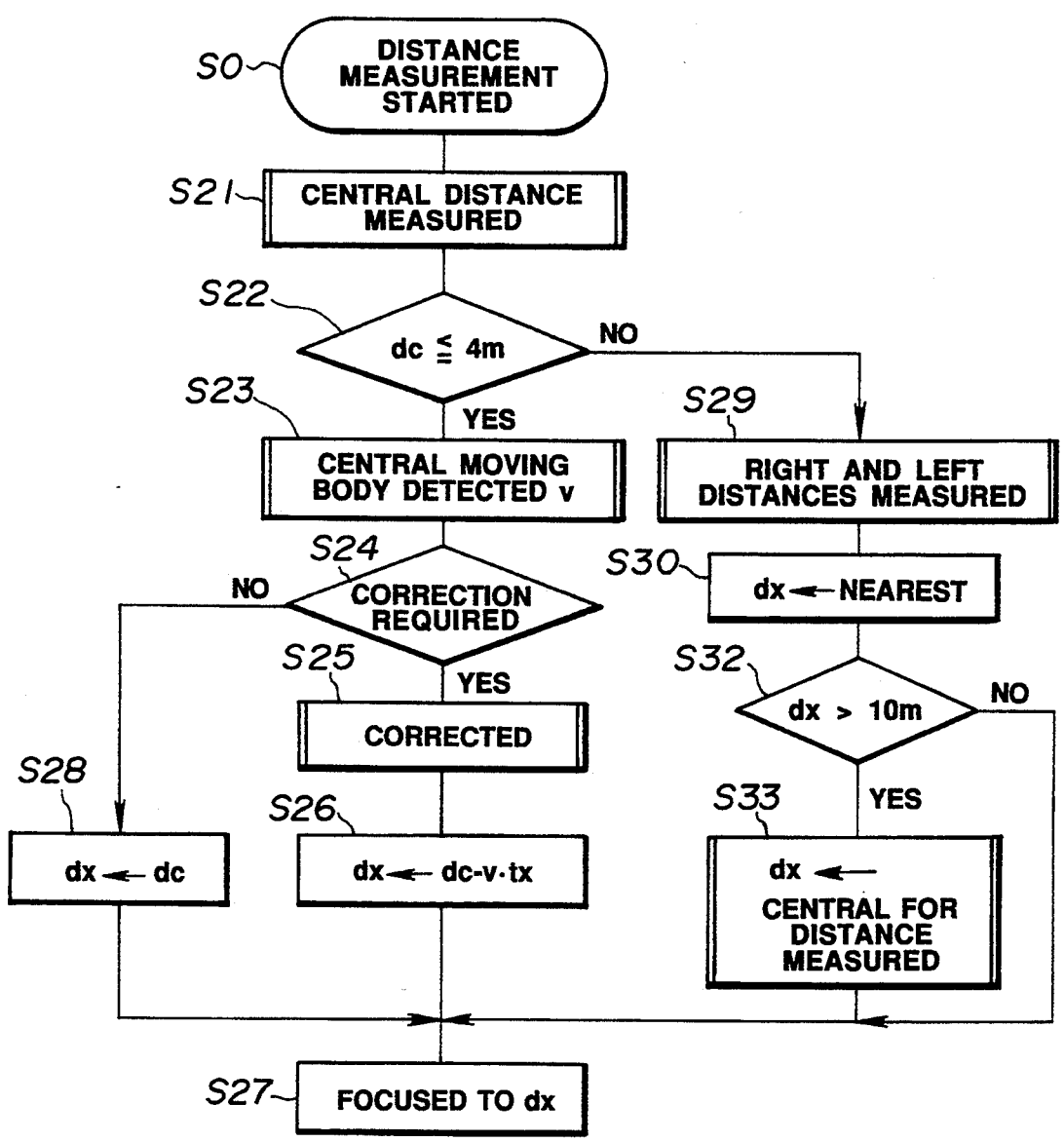
FIG. 6 is a flow chart showing the operation of the distance measuring apparatus of the second embodiment of the present invention.

The greatest difference of this second embodiment from the above mentioned first embodiment is the improvement in the distance measuring precision in the far distance of the object exceeding a predetermined value such as, for example, 4 m. and shall be explained in detail with reference to FIG. 5 showing a block formation and FIG. 6 showing a flow diagram.

In this second embodiment, there is adopted the above described active type triangular distance measuring system wherein distance measuring signal light from an IRED 51 is projected through a light projecting lens 52, the reflected light rays from an object not illustrated are received by a PSD 54 through a light receiving lens 53 and the object distance is determined by the incident positions of the reflected light.

Each of the PSD 54 and PSD 54 is divided into three parts represented by 1C, 1L and 1R and 4C, 4L and 4R in order to measure the distances not only in the center but also on the right and left of the photographed picture.

That is to say, as shown as dL1, the distance measuring light projected from the IRED1L is projected at an angle $\theta$ from the optical axis of the light projecting and receiving lens 52 or 53 or the photographing lens not illustrated. If the object is in the light projecting position, the reflected light from the object will enter the light receiving lens 53 through the light path of dL2.

The incident angle of this dL2 is inclined depending on the object distance in the direction connecting the main points of the light projecting and receiving lenses 52 and 53, that is, in the base line length direction. Therefore, the position of the signal light spot incident upon the PSD 54 is different in the base line length direction of the PSD 54 depending on the object distance. That is to say, the object distance can be determined by knowing the incident position of the signal light on the PSD 54.

Here, the function of the above mentioned PSD shall be explained. The device of this PSD has a function of outputting the incident position of this signal light as the ratio of two current signals. Therefore, if the signal light is incident upon the center of the PSD 54, the ratio of two current signals of the PSD will be 1:1. Also, if the signal light is incident upon the point internally dividing the PSD to be in a ratio of 3:1, the ratio of the current signals will be 1:3.

In the PSD having such position detecting function, the shorter the length, the higher the resolution in the case of detecting a minute displacement of the signal light and, because the position information is output as a ratio, the longer the length of the PSD, the smaller the signal variation amount for the minute displacement and the harder the detection. On the other hand, the longer the length of the PSD, the larger the signal light displacement range and the more adapted to the wide range distance measurement.

Returning to FIG. 5, amplifiers 5 to 9 are pre-amplifiers receiving the output signal of the PSD 54 with a low input impedance and amplifying it and are selected through an input terminal 14 and decoder 16 by the CPU 104 on the basis of the below mentioned Table 1.

TABLE 1

| Section | Distance Measuring Region | Amplifiers to be used |
|---------|---------------------------|-----------------------|
| 1 | Right | 8 and 9 |
| 2 | Left | 8 and 9 |
| 3 | Central (Moving object) | 5 and 7 |
| 4 | Central (Far distance) | 5 and 7 |

That is to say, the pre-amplifiers not selected are open in both input and output and perform no amplifying action.

The signal currents of the PSD 54 amplified by the amplifiers 5 to 9 are compressed by compressing circuits 10 and 11. The ratio is operated in an extension circuit 12 and a signal depending on the object distance is output to an output terminal 13.

By the way, the above mentioned compressing circuits 10 and 11 and extension circuit 12 are respectively the same as circuits 46, 57 and 62 to 64 in the technical means disclosed in FIG. 2 of U.S. patent application Ser. No. 711,641 to the present assignee.

The CPU 104 makes any of the three divided 1L, 1C and 1R of the IRED 51 emit light through the driver 15 and A/D-converts and inputs the signal output to the output terminal 13 so as to be the distance information.

By the way, in this embodiment, an intermediate electrode is provided particularly in the central distance measuring PSD 4C in order to utilize the switching of the distance measuring precision by the length of the above described PSD.

The operation of this embodiment formed as in the above shall be explained with reference to the flow chart in FIG. 6. In this case, the distance measuring light projected from the IRED1C is received by using the full range of the PSD4C. That is to say, as the intermediate electrode of the PSD4C is not used, as shown in the section 3 in the above mentioned Table 1, the pre-amplifiers 5 and 7 will be selected so that the distance from the nearest to the infinity ∞ will be in the distance measurable range.

On the other hand, in the central (far distance) distance measuring mode, as described later, tile distance to the object in the substantially central part within the photographed picture is presumed to be farther than about 10 m and therefore the distance measuring light projected from the IRED1C is received by using the upper half range in FIG. 5 of the PSD4C. That is to say, by using the intermediate electrode of the PSD4C, as shown in the section 4 in the above mentioned Table 1, the above described ratio operating operation is made by the pre-amplifiers 5 and 6.

As this intermediate electrode is provided in a position of internally dividing the PSD 54 to be in 1:1, as described above, the distance measuring precision will become twice as high. However, in this mode, only the distance farther than 10 m can be correctly measured and therefore, though the precision is high, with only this mode, no camera will be made.

In step S22, if the distance measured result dc of the above mentioned step S21 is judged, for example, to be equal to or below 4 m, the moving object distance measuring mode will be effective and therefore the moving object will be detected (step S23).

This moving object detection is to twice measure the distance at predetermined time intervals, the IRED uses the 1C and the PSD uses the full range of the 4C. Now, if the first time distance measured result is represented by d1, the second time distance measured result is represented by d2 and the distance measuring time interval is represented by tl, the object speed v in the lens optical axial direction will be determined as $$v = (d1 - d2)/t1.$$

If this object speed v is too low, for example, below 1 m/sec, the object will be considered to be substantially still, therefore the correction in step S24 will be judged to be unnecessary and the process will proceed to step S28 in which the CPU focuses the distance measured result dc. On the other hand, if object correction is necessary, the CPU will make such operation as in step S26 and will focus using the value dx.

Returning to the above mentioned step S22, if the object distance dc is farther than 4 m, in step S29, the right and left distances will be measured. First, by the 1L of the IRED and the 4L of the PSD and then, by the 1R of the IRED and the 4R of the PSD, the distances are respectively measured. The pre-amplifiers 8 and 9 are selected to be used then as shown in the sections 1 and 2 in the above mentioned Table 1. By the way, both end electrodes of the 4L and 4R of the PSD are connected respectively to the amplifiers 8 and 9.

Now, the amplifiers 8 and 9 may be connected in the same manner also to the PSD4C but, if the light receiving area is increased, the influence of the external light noise will become large and therefore the central distance measuring PSD4C having particularly the moving object detecting function is exclusively used to improve the S/N ratio and precision.

In step S30, the nearest of the dc and right and left distance measured results is selected. In step S32, if it is judged to be farther than 10 m, as described above, the length of the central PSD4C will be halved and the distance will be measured more precisely (step S33). By the way, the pre-amplifiers 5 and 6 are used.

Here, the reason why only the central distance farther than 10 m is measured shall be explained. Normally, it is very rare to photograph a figure at a distance farther than 10 m and it is often to photograph, for example, buildings or the like because the intermediate through phenomenon is considered to be hard to occur in such state.

In the above mentioned step S32, when dx is judged to be nearer than 10 m, the main object highest in the probability, that is, the nearest of the distance measured results of three points will be focused. By the way, the above mentioned judgment, operation, selection of the amplifiers and focusing operation are made by the CPU. The above is the explanation of the second embodiment of the present invention.

The third embodiment of the present invention shall be explained in the following with reference to FIGS. 7 to 9. In the above mentioned first and second embodiments, the distance of the object is measured by the ratio operating system, whereas this third embodiment is different in that the ratio operating system and light amount integrating system are both used to measure the object distance to a high precision and, by commonly using the integrating means also to detect the object speed, the speed can be detected without being influenced by noise.

Figure 7:
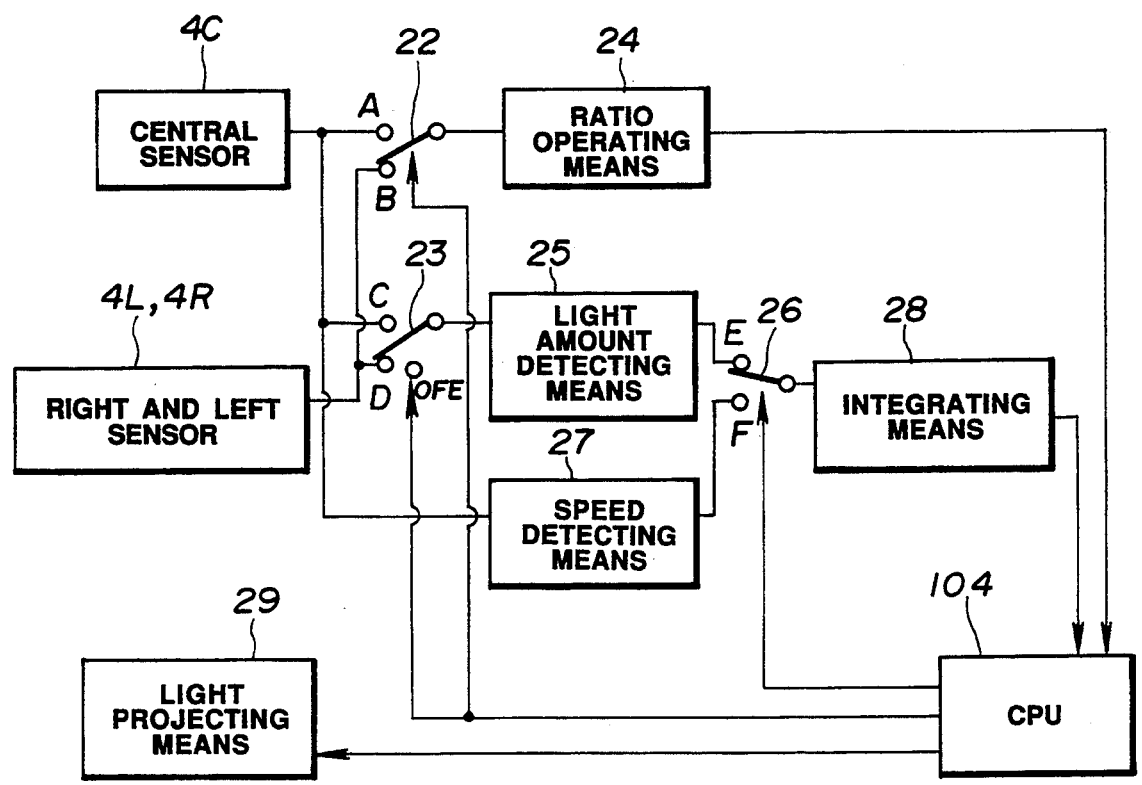
FIG. 7 is a block formation diagram of a distance measuring apparatus showing a third embodiment of the present invention.

FIG. 7 is a block formation diagram of a distance measuring apparatus showing the third embodiment of the present invention.

In the drawing, the light projecting means 29 can project light by selecting respectively the center, right and left of the photographed picture, the central sensor 4C can receive the light for measuring the central distance and the right and left sensors 4R and 4L can respectively receive the light for measuring the right and left distances. Each of the sensors takes the formation of such active type triangle distance measuring system as is shown in the above mentioned FIG. 1.

The ratio operating means 24 has the same circuit formation as of the reference numerals 44 to 47, 4 to 58 and 62 to 65 in the technical means disclosed in FIG. 2 in U.S. patent application Ser. No. 711,641 to the present assignee. The light amount detecting means 25 has the same circuit formation as of the reference numerals 70 to 80 in the technical means disclosed in FIG. 2 in the aforesaid U.S. patent application Ser. No. 711,641. The speed detecting means 27 and integrating means 28 have respectively the same formations as of the circuits represented by the reference numerals 314 and 350 in the technical means disclosed in FIG. 15 in U.S. patent application Ser. No. 720,738 assigned to the present assignee.

Figure 8:
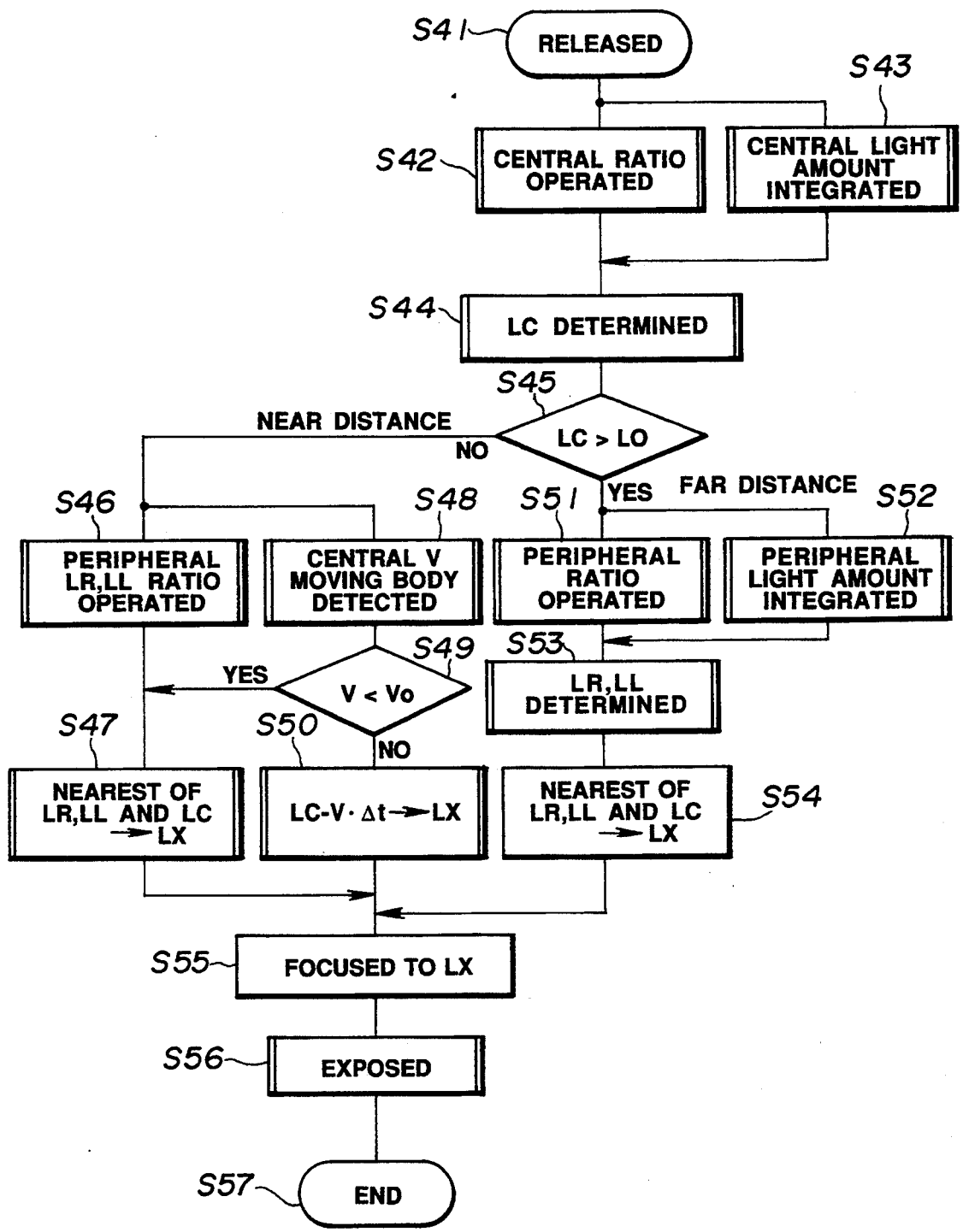
FIG. 8 is a flow chart showing the operation of the distance measuring apparatus of the third embodiment of the present invention.

FIG. 8 is a flow chart showing the operation of this embodiment.

When the shutter button is pushed to make a releasing operation (step S41), the CPU 104 will respectively switch on the switch 22 at the contact A, switch 23 at the contact C and switch 26 at the contact E to make the central distance measuring IRED of the light projecting means 29 emit light.

The central sensor 4C receives the reflected signal light from the object (not illustrated) and measures distances on the basis of the above mentioned formula (6) by the ratio operating means 24 (step S42) and on the basis of the above mentioned formula (7) by the light amount detecting means 25 and integrating means 28 (step S43).

The CPU 104 reads in these distance measured results and determines the data of a higher reliability as central distance measured data LC (step S44) and compares these data LC with distance data LO corresponding, for example, to 3 m (step S45).

As a result of this comparison, if LC is nearer than LO, as described above, the effect of the moving object distance will be obtained and, as the peripheral distances are not required to be measured by the right and left sensors 4R and 4L, the CPU 104 will switch on the switch 22 to the contact B side, switch off the switch 23 and switch on the switch 26 to the contact F side to detect the moving object speed explained in the above mentioned FIG. 2 while making the central IRED project light (step S48). At the same time, the right and left IRED's are made to emit light in turn and, by using the comparing operating means 24, the right and left distance measured results LR and LL are input into the CPU 104 (step S46).

At this time, the focusing distance Lx judging manner is changed by the output result v of the speed detecting means comprising the speed detecting means 27 and integrating means 28. That is to say, if v is below vo, for example, below 0.2 m/sec, the object will not be judged to be a moving object (step S49), the moving object correction will not be particularly made and the nearest distance measured value of the peripheral distance measured results LR and LL and the central distance measured result LC will be selected=(step S47).

On the other hand, if v is greater than vo, the main object will be judged to be the central object and the focusing distance Lx will be determined according to the below mentioned formula (8) from the time lag $\Delta t$ and the speed v which is the central distance measured result:

$$Lx = LC - v \cdot \Delta t \tag{8}$$

Returning to the above mentioned step S45, if LC is farther than LO, the CPU 104 will switch the switch 22 to the contact B side, the switch 23 to the contact D side and the switch 26 to the contact E side and the process will proceed to the flow of the steps S51 and S52. That is to say, the central IRED no longer emits light, the right and left IRED's emit light in turn respectively by the number of times of the light amount integration and the ratio operated distances and light amount integrated distances of the right and left objects are measured the same as in the above mentioned steps S42 and S43.

The step S53 is a sub-routine to select the most reliable distance measured value LR or LL from the ratio operated results and light amount integrated results and is the same routine as the above mentioned step S44. This is a step wherein, when the light amount integrated result is large enough, for example, nearer than 5 m, the S/N of the distance measuring signal will be considered to be high enough and the ratio operated result will be selected.

In step S54, the nearest distance measured value is selected from among the thus determined left side distance measured result LL, right side distance measured result LR and central distance measured result LC and this selected distance measured value is made a focusing distance Lx.

Then, in step S55, Lx is focused and this flow is terminated through an exposure sequence (step S56). By the way, the control and the above mentioned judgment and operation are made here by the CPU 104.

Figure 9A:
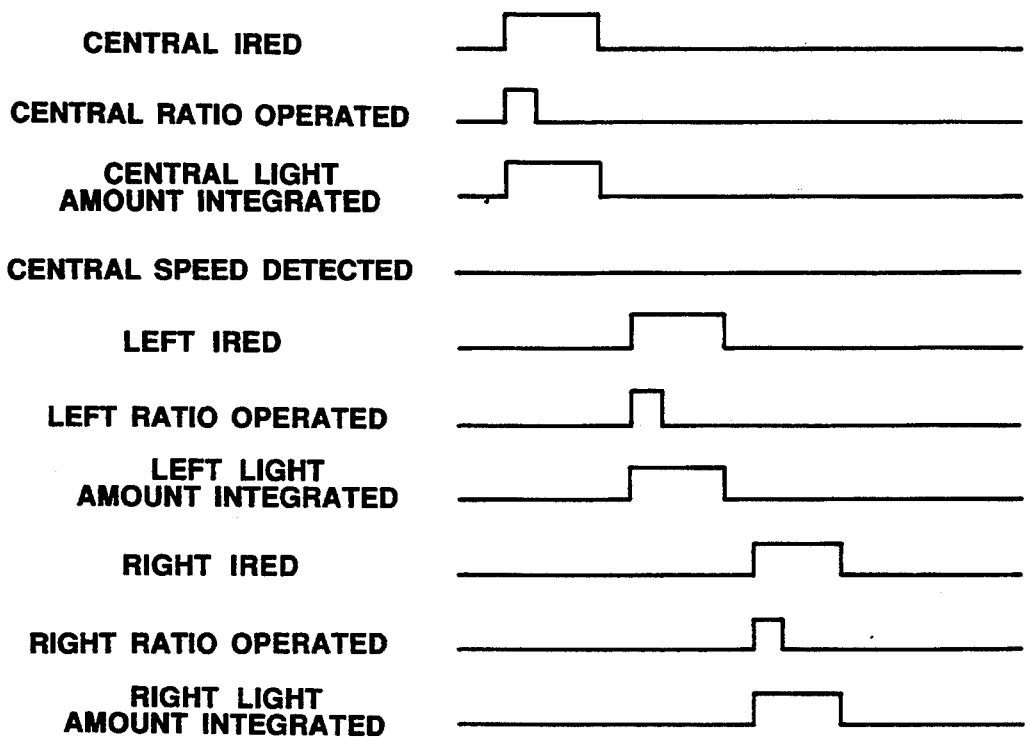
FIGS. 9A and 9B are timing charts showing the operation of the distance measuring apparatus which are useful in explaining the third embodiment of the present invention.
Figure 9B:
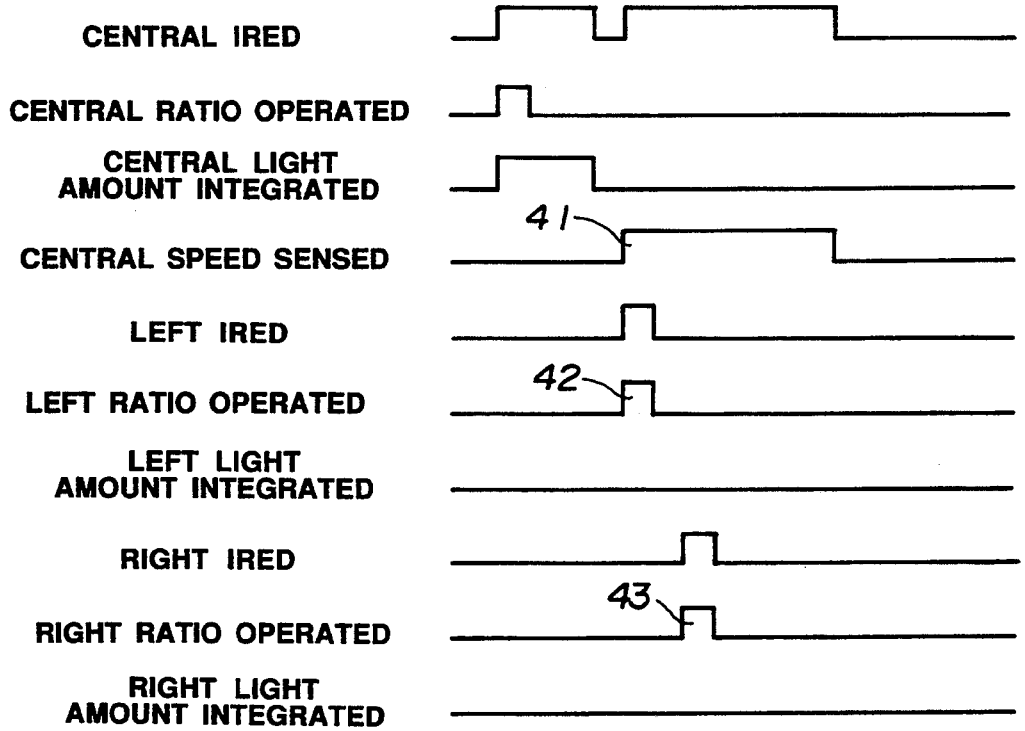

FIGS. 9A and 9B are timing charts showing the manner of the light emission and selection of the IRED. FIG. 9A shows the case of branching to YES in the step S45 in the above mentioned FIG. 8 and FIG. 9B shows the case of branching to NO.

In this embodiment, as evident particularly from the chart in FIG. 9B, during the speed sensing operation 41 which usually takes time, the right and left distance measuring operations 43 and 42 are made as overlapped and therefore the time lag can be prevented from becoming long.

Also, in this embodiment, as explained in the above mentioned FIG. 2, as the integrating means 28 is switched by the time division, without increasing such part as the condenser, that is, in an advantageous form in the cost and space, a multi-AF high in the precision and corresponding to a moving object can be provided.

There can be provided a camera wherein, as another operation is reasonably combined as described above while thus operating in the time division, the time lag will not become long and the shutter chance will be strong.

As explained in the above, according to the above mentioned respective embodiments, there can be provided a distance measuring apparatus wherein, even if the object to be photographed is not located in the center of the picture or is such moving object as a child running, the picture will not be out of focus, the time lag will be short and the shutter chance will not be likely to be missed.

In this invention, it is apparent that working modes different in a wide range can be formed on the basis of this invention without departing from the spirit and scope of the invention. This invention is not restricted by any specific embodiment except being limited by the appended claims.

What is claimed is:

1. A distance measuring apparatus for a camera, comprising:
   first distance measuring means for measuring a distance of a central part of an image to be photographed;
   comparing means for comparing a distance measurement of said first distance measuring means with a predetermined reference distance;
   second distance measuring means for measuring a distance of a peripheral part of said image;
   detecting means for detecting information relating to a moving speed of an object in said image by the use of an output from at least one of said first and second distance measuring means; and
   control means for controlling said first distance measuring means, said second distance measuring means, said comparing means and said detecting means, said control means operating said first distance measuring means, said second distance measuring means and said detecting means independently of each other to obtain a focusing value based on an output of one of said distance measuring means and said detecting means.

2. A distance measuring apparatus for a camera, comprising:
   multipoint distance measuring means for measuring a distance of a central part and a peripheral part within an image to be photographed in a sequential manner;
   detecting means for obtaining information in accordance with movement of a subject within said image, on the basis of an output from said multipoint distance measuring means; and
   control means for controlling said distance measuring means and said detecting means independently of each other, said control means including means for deciding whether or not said detecting means should be operated responsive to at least one output of said multipoint distance measuring means.

3. A distance measuring apparatus for a camera having a taking lens, comprising:
   multiple point distance measuring means for measuring a distance of a central part and a peripheral part within an image to be photographed said multiple point distance measuring means measuring distance using luminous flux reflected from said image, said reflected luminous flux impinging on said multiple point distance measuring means being independent of flux directed to said taking lens;
   moving-object detecting means for obtaining information in accordance with movement of a subject in said image, on the basis of an output from said multipoint distance measuring means; and
   control means for operating said multipoint distance measuring means and said moving-object detecting means to obtain a focusing output based on an output of one of said measuring means and said detecting means.

4. A distance measuring apparatus for a camera comprising:
   multipoint distance measuring means for measuring a distance of a central part and a peripheral part within an image to be photographed;
   detecting means for obtaining information in accordance with movement of a subject, on the basis of an output from said multipoint distance measuring means; and
   control means for controlling operation of each of said multipoint distance measuring means and said detecting means in a predetermined order, said control means including means for deciding whether or not said detecting means should be operated in response to an output from said distance measuring means.

5. A method for operating the lens of a camera having an adjustable focal length comprising the steps of:
   (a) determining a distance of a central part of an image from said camera;
   (b) determining a distance of a peripheral part of said image from said camera;
   (c) utilizing distance information obtained during one of steps (a) and (b) for determining a moving speed of a subject in said image when a predetermined value is obtained during one of stops (a) and (b); and
   (d) performing steps (a) through (c) independently of one another.

6. A distance measuring method for a camera comprising the steps of:
   (a) measuring a distance between a central part and a peripheral part of an image to be photographed in a timed sequential manner;
   (b) determining a moving velocity of a subject within said image utilizing the measurement information of step (a); and
   (c) step (b) further including the step of determining whether said moving velocity should be obtained based upon an output obtained during step (a).

7. A method for measuring distance for a camera comprising the steps of:
   (a) measuring a distance of a central part of an image from said camera;
   (b) measuring a distance of a peripheral part of said image from said camera;
   (c) determining a moving velocity of a subject in said image based upon measurement data obtained during one of steps (a) and (b); and
   (d) step (c) further including determining whether a moving velocity should be obtained responsive to an output obtained during one of steps (a) and (b).

8. A distance measuring apparatus for a camera, comprising:
   (a) projecting means for projecting a plurality of distance measuring lights to a subject;
   (b) light receiving means arranged in spaced relation to said projecting means by a given base length, for receiving reflected lights of the respective distance measuring lights from the subject;
   (c) first determining means for determining a focusing distance in accordance with incident positions of the respective distance measuring lights incident upon said light receiving means;
   (d) second determining means for determining a focusing distance from the camera, in accordance with a light quantity of said distance measuring lights incident upon said light receiving means; and (e) selecting means for selecting one of said first and second determining means to obtain a focusing value.

9. A distance measuring apparatus for a camera having a taking lens, comprising:
   (a) distance measuring means for measuring a distance of each of a plurality of points within an image plane said distance measuring means measuring distance using luminous flux reflected from objects in said image, said reflected luminous flux impinging on said multiple point distance measuring means being independent of flux directed to said taking lens;
   (b) selecting means for selecting one of said plurality of points within said image plane;
   (c) speed-signal outputting means for outputting a signal responsive to a moving speed of a subject existing in a region of said selected point; and
   (d) deciding means for deciding a focusing distance of the camera, responsive to outputs of at least one of said distance measuring means and said speed-signal outputting means.

10. A distance measuring apparatus according to claim 9, wherein said distance measuring means includes:
   a plurality of projecting elements for projecting a plurality of distance measuring lights to the subject;
   a plurality of light receiving elements for receiving reflected signal lights of the plurality of respective distance measuring lights from the subject; and
   deciding means for deciding said subject distance on the basis of incident lights of the respective signal lights, of said light receiving element.

11. A distance measuring apparatus according to claim 9, characterized in that said selecting means performs selection in accordance with the output results of said distance measuring means.

12. A distance measuring apparatus according to claim 10, characterized by comprising light-quantity detecting means for detecting the light quantity of incident signal lights incident upon at least one of said light receiving elements.

13. A distance measuring apparatus for a camera, comprising:
   (a) projecting means for projecting distance measuring light to a subject;
   (b) light receiving means for receiving reflected signal light of said distance measuring light, from said subject;
   (c) determining means for determining a focusing distance in accordance with a light quantity of said distance measuring light, which is incident upon said light receiving means; and
   (d) signal means for outputting a signal responsive to a moving speed of the subject, in accordance with a change in time of said distance measuring light which is incident upon said light receiving means.

14. A distance measuring apparatus for a camera, comprising:
   (a) a central distance-measuring device for measuring a distance of a central point within an image plane;
   (b) a peripheral distance-measuring device for measuring a distance of a peripheral point within the image plane;
   (c) signal means for forming a signal responsive to a moving speed of a subject;
   (d) selecting means for selecting said signal means; and
   (e) means for bringing said peripheral distance-measuring means to an inoperative condition when said signal means is selected.

15. A distance measuring apparatus, according to claim 14, characterized in that said selecting means selects said signal means in accordance with output results of said central distance-measuring means.

16. A distance measuring apparatus for a camera, comprising: (a) projecting means for projecting a distance measuring light to a subject;
   (b) receiving means having a plurality of light receiving surfaces for distance measuring for receiving a reflected signal component from said subject, of said measuring light for detecting an incident position of said reflected signal component and including means for selectively operating said surfaces for determining one of distance decomposition, distance resolution and range resolution; and
   (c) signal means for forming a signal responsive to a moving speed of the subject.

17. A distance measuring apparatus according to claim 16, characterized in that said projecting means comprising a plurality of projecting elements, enabling a distance of a plurality of points within the image plane to be measured.

18. A distance measuring apparatus for a camera, comprising:
   (a) projecting means for projecting a distance measuring light to a subject;
   (b) receiving means having a plurality of light receiving surfaces for distance measuring for receiving a reflected signal component from said subject, of said measuring light for detecting an incident position of said reflected signal component and including means for selectively operating said surfaces for determining one of distance decomposition, distance resolution and range resolution; and
   (c) signal means for forming a signal responsive to a moving speed of the subject;
   said projecting means comprising a plurality of projecting elements, enabling a distance of a plurality of points within the image plane to be measured;
   a plurality of light receiving elements for receiving reflected signal lights from a plurality of points within an image plane, being arranged on opposite sides of said plurality of light receiving surfaces.

19. A distance measuring apparatus for a camera having a taking lens, comprising:
   (a) a multi-point distance measuring device for measuring a distance of a plurality of points within an image plane for determining an absolute distance of a subject independent of the taking lens of the camera;
   (b) signal means responsive to measurements of said distance measuring device for forming a signal representing a moving speed of a subject;
   (c) determining means for determining a focusing distance in accordance with output results of said signal means and output results of said multi-point distance measuring device; and
   (d) focusing means for adjusting a focus point of the taking lens based on an output of said determining means.

20. A distance measuring apparatus according to claim 19, characterized in that said multi-point distance measuring device has projecting means for projecting distance-measuring light in directions which are different in time series from each other.

21. A distance measuring apparatus for a camera, comprising:
   (a) projecting means for projecting distance-measuring light to a plurality of points within an image plane;
   (b) light receiving means arranged in spaced relation to said projecting means by a given base length, for receiving reflected signal light of said distance measuring light, from a subject;
   (c) integrating means for integrating an output signal generated by said light receiving means responsive to said reflected signal light;
   (d) computing means for computing a distance in accordance with output results of said integrating means; and
   (e) signal means for outputting a signal which relies upon a moving speed of the subject which is located at a center region within the image plane.

22. A distance measuring apparatus for a camera having a taking lens, comprising:
   (a) multi-point distance measuring means for measuring distance of a plurality of points within an image plane independently of the taking lens;
   (b) signal means for outputting a signal responsive to a moving speed of a subject in the image plane; and
   (c) selecting means for selecting a closest distance measuring value of an output from said multi-point distance measuring means, and a corrected focusing distance by said signal forming means.

23. A distance measuring apparatus for a camera, comprising:
   plural light projecting means each projecting a distance measuring light to a subject;
   plural light receiving means each associated with one of said light projecting means;
   one of said light receiving means for receiving light from a central portion of an image field;
   the remaining light receiving means receiving light from different peripheral portions of said image field;
   said one light receiving means for receiving light from the central portion of an image field comprising a plurality of light receiving surfaces;
   means for determining distance from an object in the central portion of an image field utilizing a first combination of said plurality of surfaces;
   means for determining distance of objects in said peripheral portions of said image field when the distance measurement obtained using said first combination of said light receiving surfaces is greater than a predetermined value;
   means utilizing a second combination of said light receiving surfaces for determining a speed of an object in the central portion of the image field when the distance of the object determined from said first combination of light receiving surfaces is less than a predetermined value; and
   means for using one of said central and peripheral distance measurements and said speed detection measurement for obtaining a final focusing value.

24. A distance measuring apparatus for focusing a camera comprising the steps of:
   (a) projecting distance measuring light toward an image field;
   (b) determining a distance of an object in a central portion of the image field based on light reflected therefrom;
   (c) determining distances of objects in first and second peripheral portions of the image field based on light reflected therefrom;
   means for detecting an amount of light from a sensor coupled thereto;
   means for detecting speed coupled to said central sensor;
   means for integrating a signal coupled thereto;
   means for simultaneously coupling said central sensor to said distance determining means and said light amount detecting means and for coupling said means for integrating to said speed detecting means;
   means for decoupling said central sensor from said distance detecting means and said light amount detecting means and for coupling said peripheral sensors to said distance detecting means and light amount detecting means when a distance value greater than a predetermined value is outputted from one of said distance detecting means and integrating means when said central sensor is coupled thereto;
   means for decoupling said integrating means from said light amount detecting means and coupling said integrating means to said speed detecting means when a distance obtained from said right and left sensors is greater than a predetermined value to determine a speed of an object in the central portion of the image field; and
   determining a focusing output based on the values obtained.

25. A method for measuring distance for focusing a camera comprising the steps of:
   (a) projecting distance measuring light toward an image field;
   (b) determining a distance of an object in a central portion of the image field based upon an angle of light reflected therefrom;
   (c) determining the brightness of light reflected from the object in said central portion;
   (d) integrating said brightness light over a given time interval;
   (e) performing the following steps (f) through (h) when at least one of the distance measurements obtained through the performance of steps (b) through (d) is greater than a predetermined value:
   (f) determining a distance of an object in at least one peripheral portion of the image field based upon an angle of light reflected therefrom;
   (g) detecting the brightness of light reflected from the object in said peripheral portion;
   (h) integrating the light obtained in step (f) over a given interval of time;
   (i) detecting a speed of the object in said central portion when the distance of the object in said peripheral portion is greater than a predetermined value; and
   (j) determining a focusing value based on the distance values obtained in the performance of steps (b) through (d) and (f) through (i).

26. The method of claim 25 wherein steps (c) through (d) are performed during a period of time which overlaps with the performance of step (b).

27. The method of claim 25 wherein steps (g) through (h) are performed during a period of time which overlaps with the performance of step (f).

* * * * *